United States Patent [19]

Blomgren

[11] Patent Number: 4,457,204
[45] Date of Patent: Jul. 3, 1984

[54] EXPLOSIVE CHARGE-CONTAINING NUT

[75] Inventor: Erne Blomgren, Kungälv, Sweden

[73] Assignee: Kitz Corporation, Tokyo, Japan

[21] Appl. No.: 285,608

[22] Filed: Jul. 21, 1981

[51] Int. Cl.³ .................... F41F 13/00; F16L 41/04
[52] U.S. Cl. .................................. 89/1 B; 102/204; 102/470; 137/318
[58] Field of Search .............. 137/67, 68 A, 318; 222/80; 102/204, 470, 380; 89/1 B

[56] References Cited

U.S. PATENT DOCUMENTS

| | | | |
|---|---|---|---|
| 643,974 | 2/1900 | Parker | 102/204 |
| 831,947 | 9/1906 | Graeme et al. | 102/204 |
| 3,221,932 | 12/1965 | Anderson | 137/67 X |
| 3,575,111 | 4/1971 | Richardson | 102/204 X |
| 3,789,761 | 2/1974 | Travor | 102/204 |
| 3,837,107 | 9/1974 | Swaim et al. | 89/1 B X |
| 3,983,897 | 10/1976 | Gebelius | 222/80 X |
| 4,027,592 | 6/1977 | Hübsch et al. | 102/470 X |
| 4,195,550 | 4/1980 | Witt et al. | 102/204 X |
| 4,261,384 | 4/1981 | Dahlbring | 137/318 |
| 4,353,304 | 10/1982 | Hübsch et al. | 102/470 |

Primary Examiner—David H. Brown
Attorney, Agent, or Firm—Holman & Stern

[57] ABSTRACT

A T-joint having a two-part housing applicable to a pipe contains a member adapted to cut a hole in the pipe when acted upon by an explosive charge to provide a branch conduit from the pipe. The explosive charge is contained in a nut attachable to the housing and is ignited by a percussion cap. The bottom portion of the nut is provided with three concentric recesses, each one smaller than the preceding one. The first recess holds the charge, the second recess holds a breech member for the percussion cap, and the third recess holds an anvil for firing the cap.

2 Claims, 2 Drawing Figures

EXPLOSIVE CHARGE-CONTAINING NUT

BACKGROUND OF THE INVENTION

1. Field of The Invention

This invention relates to explosively activated T-joint pipe fittings.

2. Description of the Prior Art

There are several designs of T-joints applicable to pipes for making it possible in an easy way to provide a branch conduit, without having to disconnect or empty the piping. The housing of the T-joint contains a member having a sharp edge for cutting a hole in the pipe and an explosive charge for actuating the cutting member.

The selection of the size and also the location of the charge requires some consideration, and it is deemed important that the charge, within the very limited explosion chamber available shall be able to cover a major part of the back face of the cutting member.

U.S. Pat. No. 4,261,384 held by the assignee of the present invention shows a favourable arrangement of a charge contained in a cartridge, which is easily fitted between the nut and the housing. The shape of the cartridge is to some degree determined by a desire to provide access for a spindle to rotate the cutting member afterwards, in order to make the same serviceable as a valve body for occasionally blocking the branch conduit. The cost of the cartridge is furthermore rather high.

SUMMARY OF THE INVENTION

The object the present invention is to provide a nut for holding and discharging the charge, which is cheap to manufacture and provides favourable action of the explosion gases upon the cutting member.

The bottom of the nut is provided with three concentric recesses, each having a smaller diameter than the preceeding one, starting from the inward face of the bottom surface. The first, largest recess is intended to hold the charge, and there will thus be no need to make a separate cartridge. The recess is dimensioned to hold the biggest charge usable with the particular size of housing, plus the necessary wadding. Possible small reductions in the content of the charge for certain applications can be taken care of by the wadding being pressed further down into the recess.

The second recess holds a breech member containing the percussion cap, and the third recess holds an anvil for acting upon the percussion cap. A bore permits the occasional introduction of a pin from outside the nut into the third recess for forcing the anvil against the percussion cap.

DETAILED DESCRIPTION OF THE PREFERRED EMBODIMENT

Figure 1:
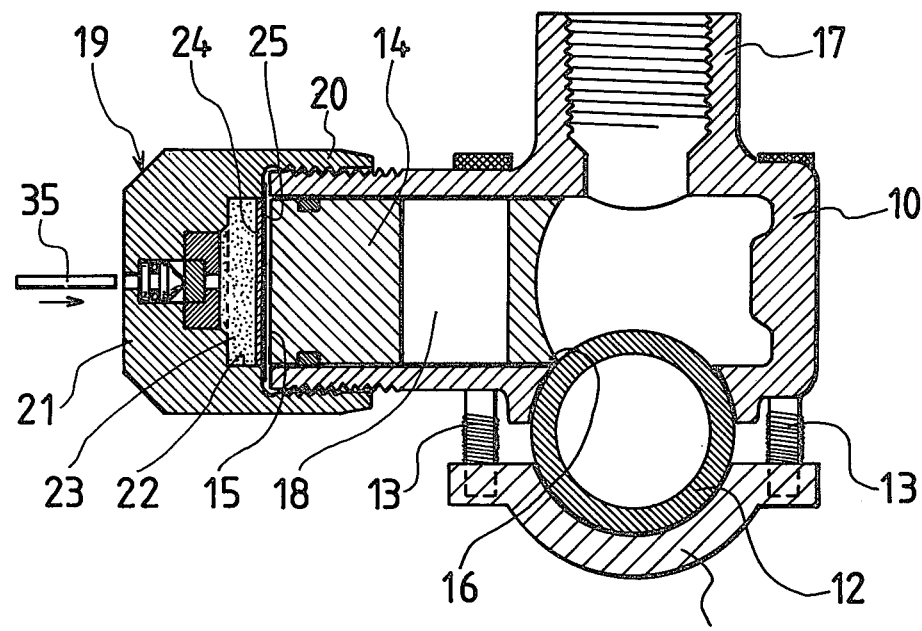
FIG. 1 shows a cross sectional view through a T-joint having an explosive nut according to the invention.
Figure 2:
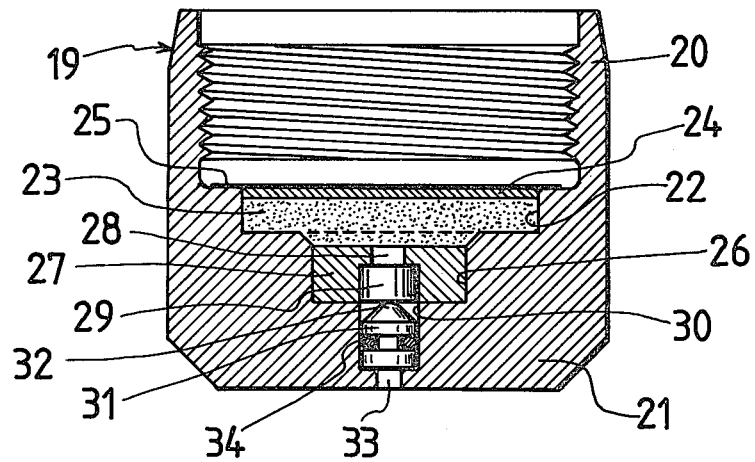
FIG. 2 shows, on a larger scale, a cross section through the explosive nut.

The T-joint is of a type well known in the art and contains a housing comprising two parts 10, 11 adapted to be clamped about a pipe 12 by means of bolts 13. One part 10 of the housing has a bore directed perpendiculary to the pipe and enclosing a mainly cylindrical member 14 having a back face 15 to be acted upon by an explosive charge, as well as a cutting edge 16, which will pierce the wall of pipe 12, to provide connection between the interior thereof and a branch conduit, which is to be fitted at an attachment 17 at the housing. There is a fluid passage 18 in the member 14, which will be aligned with the hole in the pipe 12, when the member has reached its final position.

The explosive charge is located in a nut 19, which is screwed or otherwise secured to the housing. The present invention concerns the nut which has a side wall having an internally threaded circular wall face 20 and a sturdy bottom portion 21.

In the inward face of the bottom portion there is a cylindrical recess 22 of sufficient volume to hold the necessary charge 23, which may be supplied as a powder or possibly be compressed into a tablet snugly fitting into the recess. The charge is covered by a wadding 24 which in turn is covered by a watertight foil 25.

A second recess 26, concentric with the first one and having a smaller diameter than the same, is sunk into the bottom portion 21. In use a breech body 27 having a through-passage 28 is fitted into this recess, and holds a percussion cap 29. The breech body 27 fills the cross section of the recess completely, but is slightly lower than the height of the recess. The breech body is secured to the bottom portion in any suitable manner, for instance by the edge of the recess being deformed by strokes with a prick punch. The body will remain for ever within the nut and the slight damage does no harm.

Adjoining the second recess there is a third recess 30, concentric with the previous ones, but with a smaller diameter than the second recess. Within the third recess a cylindrical anvil 31 having a pointed end 32 is fitted. A small-diameter bore 33 communicates the third recess with the outward face of the bottom portion of the nut.

The anvil is provided with a peripheral recess in which a sealing ring 34 is fitted. This will prevent explosion gases from blowing backwards through the bore 33.

When the charge is to be fired a pin 35 is introduced into the bore 33. A slight stroke with a hammer upon the pin will force the pointed end of the anvil 31 into contact with the percussion cap 29, so this is fired and ignites the charge 23.

As described above the explosion gases will drive the cutting member 14 against the pipe 12 to cut the desired hole therein and as the first recess 22 has about the same diameter as the body 14 there will be an uniform action of the gases upon the back face of the member.

I claim:

1. An explosive charge holding nut for use with a T-joint of the type comprising a two-part housing for clamping to a pipe and enclosing a member for cutting a hole in said pipe upon ignition of the charge to form a branch conduit from said pipe, wherein said nut comprises a cylindrical wall portion having means for attachment to said housing and a base portion, a first circular recess in the inner face of said base portion facing said housing having a volume sufficient to receive an explosive charge to produce the desired cutting action and a diameter no larger than the inner diameter of the housing at the part thereof attached to said nut, a cylindrical second recess, coaxial with and extending from said first recess and having a smaller diameter than said first recess, a cylindrical third recess, coaxial with and extending from said second recess and having a smaller diameter than said second recess, a bore extending from the outer face of said base portion to said third recess having a smaller diameter than said third recess, a breech body axially slidably received in said second recess and adapted to substantially fill said second recess, a bore through said breech body communicating with said first recess and said third recess and substantially coaxial therewith, a percussion cap within said bore in the breech body, and an anvil slidably disposed in said third recess and extending from said bore in said base portion to said percussion cap, so that said charge can be exploded only by inserting a pin type member through said bore in said base portion to propel said anvil against said percussion cap to fire said percussion cap which ignites the charge.

2. The nut according to claim 1 wherein said recesses are coaxial with the nut and further comprising at groove in said anvil, a sealing ring in said groove, a wadding in said first recess covering the inner face of said charge, a watertight foil covering said wadding, and a conical point on the inner end of said anvil adjacent said percussion cap.

* * * * *